United States Patent [19]

Cammarano et al.

[11] Patent Number: 4,465,223
[45] Date of Patent: Aug. 14, 1984

[54] PROCESS FOR BRAZING

[75] Inventors: Armando S. Cammarano, Hyde Park; Giulio DiGiacomo, Hopewell Junction, both of N.Y.

[73] Assignee: International Business Machines Corporation, Armonk, N.Y.

[21] Appl. No.: 514,137

[22] Filed: Jul. 15, 1983

Related U.S. Application Data

[63] Continuation of Ser. No. 221,603, Dec. 31, 1980, abandoned.

[51] Int. Cl.³ .............................................. B23K 1/04
[52] U.S. Cl. .............................. 228/198; 228/263.18; 228/123
[58] Field of Search ............... 228/238, 122, 123, 124, 228/263.18, 263.11, 198; 428/671, 620

[56] References Cited

U.S. PATENT DOCUMENTS

| 3,663,217 | 5/1972 | Olsen | 228/263.11 |
| 3,703,306 | 11/1972 | La Chance | 228/238 |
| 3,769,619 | 10/1973 | Ang | 228/122 |

FOREIGN PATENT DOCUMENTS 4814505  5/1973  Japan ................................. 228/122

Primary Examiner—Nicholas P. Godici
Assistant Examiner—Marc Hodak
Attorney, Agent, or Firm—Robert W. Berray

[57] ABSTRACT

A method of brazing two surfaces together with a Au/Sn brazing solder. The method includes the additional step of providing a film of Cu, for example on one of the surfaces, in addition to the Au/Sn brazing solder.

3 Claims, 3 Drawing Figures

PROCESS FOR BRAZING

This is a continuation of application Ser. No. 221,603 filed Dec. 31, 1980, now abandoned.

INTRODUCTION

1. Field of the Invention

This invention relates to a method for brazing. More particularly, it relates to a method for brazing that is particularly useful for chips in manufacturing an electronic system.

2. Background of the Invention

In the manufacture of electronic systems, one step involves the brazing of electrical connection pins to metal pads on electronic chips. A braze material commonly used for this bonding is composed of 80/20 Au/Sn. During a typical manufacturing process, a device may be heated and reheated 10 or 15 times, or perhaps even more, as additional chips are joined to a substrate and as corrections, repairs and engineering changes are made to the device. Each time one of these reheating, or "reflow" steps is performed, all existing brazed joints will be reheated to some extent. This reheating of existing brazed joints can result in degradation of the metallurgy of the braze joint. This reduces the strength of the joint and can lead to pins tilting or even falling off entirely during handling of the substrate.

Prior Art

Some solutions to the above problem are presented in copending application Ser. No. 221,606 filed December 31, 1980 filed and assigned to International Business Machines Corporation. As is described in that patent application, it can be advantageous to bring other metals (for example, metals from Groups IB and VIII) into contact with the surfaces to be brazed. This will raise the melting temperature of the resulting brazed joint to a temperature that is substantially above the melting temperature of the brazing solder which is used initially to make the joint. Thus, the resulting joint will be far less likely to be affected by subsequent reflows.

Brief Summary of the Invention

As compared with the prior art, our invention has two essential elements: the particular metal selected for addition to the braze solder; and the manner in which it is added. We have discovered that, especially in a process in which a gold-rich brazing solder is used, the preferred metal to add is copper. Copper exhibits substantial advantages over all other alternatives that we have investigated. We have also discovered that the best way to add the Cu is to provide it in the form of a film. In accordance with a preferred embodiment of our invention, the Cu film is provided by plating it onto one of the surfaces to be joined. In accordance with another embodiment of the invention, the Cu film is provided by a copper "preform" which may be used in conjunction with braze solder preforms.

Detailed Description

Figure 1:
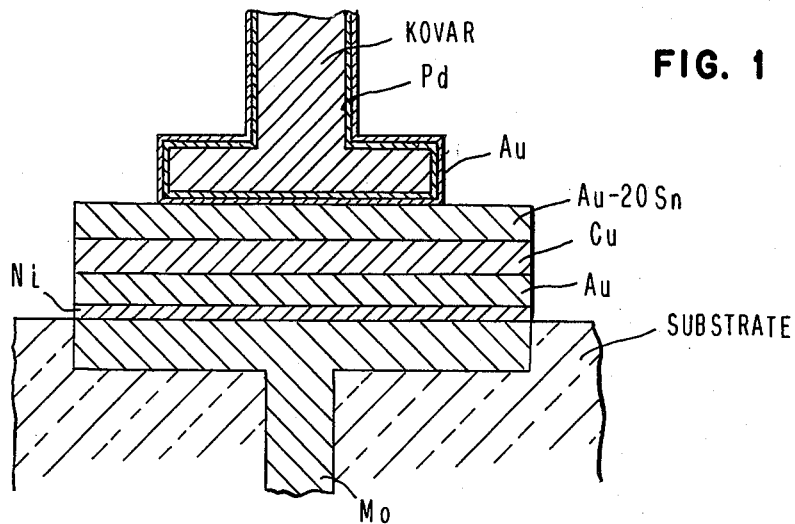
FIG. 1 shows a fragment of a multilayered ceramic substrate having a connecting pad that is to be brazed to a pin in accordance with this invention.

FIG. 1 shows a portion of a multi-layered ceramic substrate carrying a molybdenum (Mo) pad which is conventionally protected with a layer of nickel (Ni) approximately 3 microns thick. On top of the Ni is a film (approximately ¼ micron) of gold (Au). Also shown in FIG. 1, ready to be brazed to the pad is an electrical connecting pin constructed primarily of Kovar coated with a film of palladium (Pd) approximately 4 microns thick on which another film of Au approximately 1¼ microns thick is also used. In order to join the pin to the pad, an 80/20 Au/Sn brazing solder is also provided.

Everything described in the preceding paragraph is completely conventional in processes for bonding pins to pads. The additional feature shown in FIG. 1, in accordance with our invention, is the layer of copper (Cu), preferably approximately 8 microns in thickness, that is plated onto the top of the Mo/Ni/Au pad. The layer of Cu can have been plated onto the pad by, for example, evaporation or electrodeposition or any other manner known to those skilled in the art.

Brazing of the pin to the pad with the 80/20 Au/Sn brazing solder then proceeds exactly as it would have if the additional Cu layer had not been provided. When the brazing solder and the surfaces to be joined are heated to above approximately 280° C. (the liquidus point for the eutectic 80/20 alloy) the brazing solder melts and the copper diffuses through the Au/Sn brazing solder to form a ternary Au/Sn/Cu alloy. The copper diffuses through the rest of the brazing solder so quickly that the diffusion goes to completion in a time that is quite short with respect to the brazing cycle. Perhaps a matter of just a few seconds. Upon cooling, there will be a resulting brazed joint which, because of the addition of the Cu, has a solidus point of approximately 350° C., in contrast to the temperature of 280° C. that was required in order to form the joint in the first place. Thus, subsequent reflows involving the substrate which might heat this joint to as much as approximately 350° C. will not affect the integrity of this brazed joint.

Figure 2:
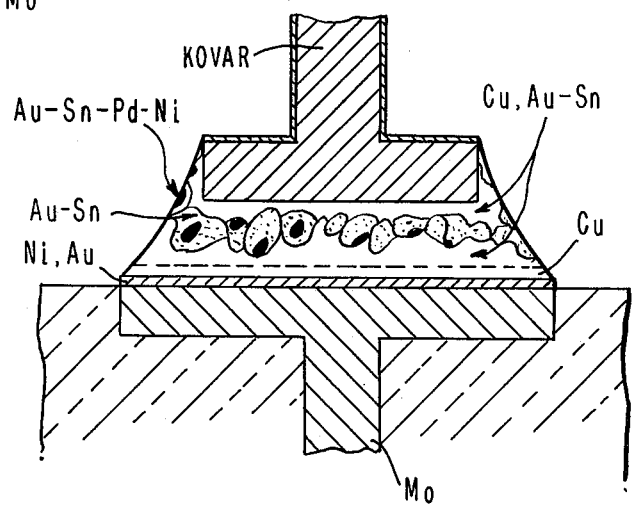
FIG. 2 shows details of a braze joint structure after brazing in accordance with the invention.

The structure of the resulting brazed joint is shown in FIG. 2. Above the surface of the pad there will remain some Cu that is bonded to the upper layers of the pad. Above the Cu is the braze joint itself that is substantially comprised of Au, Sn and Cu. Laboratory analyses of brazed joints prepared in accordance with the invention have shown the joint to be comprised substantially of a Cu/Au/Sn alloy (approximately 70% of the joint), a Au/Sn alloy (approximately 25% of the joint) and a Au/Sn/Pd/Ni alloy (approximately 5% of the joint). The latter alloy is a result of the migration of Pd and Ni from the pin and the pad into the brazed joint.

The following table depicts further details of the brazed joint. The table shows the percent by weight of metals found, by laboratory analysis, within various portions of the brazed joint. For each portion, two sets of figures are given. The first set of figures show the percentages of various metals within a joint as brazed (As-B); that is, immediately after brazing.

|   | Au—Sn—Cu 70% | | Au—Sn 25% | | Au—Sn—Pd—Ni 5% | | Bulk 100% | |
|---|---|---|---|---|---|---|---|---|
|   | As—B | 15Rf | As—B | 15Rf | As—B | 15Rf | As—B | 15Rf |
| Au | 77.4 | 79.6 | 61.3 | 61.9 | 27.9 | 32.2 | 70.0 | 71.9 |
| Sn | 8.9 | 10.9 | 37.1 | 36.4 | 44.8 | 41.9 | 20.2 | 19.1 |
| Cu | 14.5 | 11.4 | 0.4 | 0.4 | 2.7 | 2.1 | 7.0 | 6.4 |
| Pd | 0.4 | 0.1 | 0.6 | 0.2 | 13.5 | 16.3 | 1.6 | 1.1 |
| Ni | 0.1 | 0.0 | 0.1 | 0.0 | 10.7 | 6.6 | 0.3 | 0.15 |

The second set of figures shows the composition of a joint after 15 reflows (15RF) at approximately 350° C. The most significant point shown by the table is that the brazed joint is quite stable throughout a large number of reflows. (Differences between the first and second sets of figures are partly attributable to (1) measuring accuracies, and (2) the fact that the first and second sets were from measurements on different braze joints.)

One other important point is illustrated by the table. It is significant to note that the total bulk of the brazed joint contains approximately 7% Cu. For this reason, in preferred embodiments of the invention, a sufficient amount of Cu is provided so that there will be enough Cu to form at least 7% by weight of the final brazed joint. A preferred way of providing a sufficient amount of copper is to provide a copper film that is approximately ⅛ the thickness of the Au/Sn brazing solder. Note that one feature of this invention is that the precise amount of copper provided is not critical, so long as enough is provided. As is illustrated in FIG. 2, any excess copper (that is, copper that is not alloyed into the braze joint itself) simply forms a smooth transition from one surface to the brazed joint. From the pad to the pin, all transitions are smooth and homogeneous. As is further illustrated by the diagram of FIG. 2, the use of this method results in a joint with substantially no intermetallics and minimal voids. As is known to those skilled in the art, the presence of intermetallics and voids in a brazed joint are substantial contributors to joint failure.

Figure 3:
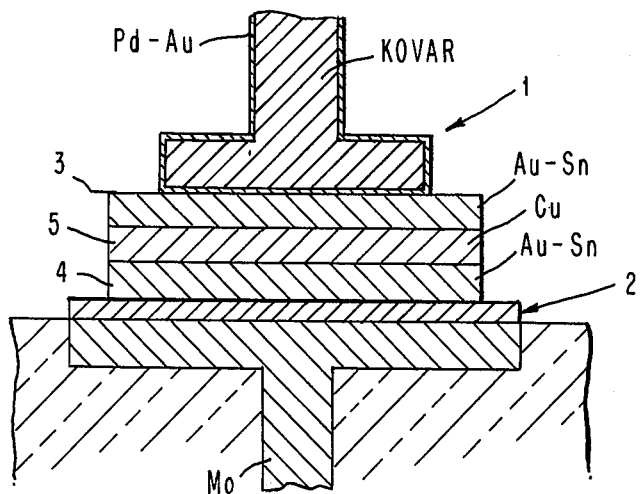
FIG. 3 is similar to FIG. 1 but showing an alternative embodiment of the invention.

Referring now to FIG. 3, an alternative embodiment of the invention is illustrated. FIG. 3 again depicts a pin 1 that is to be joined to a pad 2. However, this time the brazing material comprises two layers 3 and 4 of 80/20 Au/Sn, one of which is placed in contact with pin 1 and the other of which is in contact with pad 2. In accordance with this alternative embodiment of our invention, intermediate the two layers of Au/Sn is an additional layer of Cu 5. When brazing takes place the additional layer of Cu 5 will diffuse through the brazed joint in the same manner as has been described above.

In the preceding descriptions of preferred embodiments of the invention, examples were used of a pin and a pad having, respectively, a Pd/Au surface and a Ni/Au surface. However, it should be recognized that the surface upon which the Cu is placed can be any surface to which the Cu can be bonded metallurgically or even mechnically.

Also, although we have described a process using Au/Sn solder, it will be recognized that other gold-rich solders, such as for example, Au/In could also be used.

Although, as has been noted above although we prefer to electroplate the copper onto one of the surfaces to be joined, those skilled in the art will recognize that many other appropriate methods for placing the copper on the surface can be used.

Another advantage of our invention which will be clear from the above description is that although it adds a step to existing processes for brazing items together, the added step (providing a film of Cu) does not affect the other steps in an existing brazing process. Also of significance is the fact that a common Au/Sn braze, with which those skilled in the art are quite familiar, can be used without alteration.

While the invention has been particularly shown and described with reference to preferred embodiments thereof, it will be understood by those skilled in the art that the above and other changes in form and details may be made therein without departing from the spirit and scope of the invention.

Having thus described our invention, what we claim as new and desire to secure by Letters Patent is:

1. A brazing process in which two structures are joined together with a gold-rich 80/20 Au/Sn brazing solder, characterized by the additional steps of:
   providing a film of the brazing solder on a surface of at least one structure to be brazed, providing a film of copper in contact with said brazing solder, and heating the structures to approximately 280° C. to thereby form a braze joint including a ternary Au/Sn/Cu alloy.

2. The brazing method of claim 1 wherein:
   the amount of copper that is provided is sufficient so that it can provide an amount of copper equal to approximately 7% by weight of the metal in the resulting brazed joint.

3. The brazing method of claim 1 or claim 2 wherein:
   the gold-rich brazing solder is provided in two separate films, each film being in contact with one of the surfaces to be brazed; and
   the copper film is sandwiched between said two gold-rich films.

* * * * *